(12) United States Patent
Kubota et al.

(10) Patent No.: US 11,285,371 B2
(45) Date of Patent: Mar. 29, 2022

(54) MEDIUM, METHOD, AND APPARATUS FOR DISPLAYING JOINT ANGLE OF PERFORMER FOR SCORING

(71) Applicant: FUJITSU LIMITED, Kawasaki (JP)

(72) Inventors: Kazumi Kubota, Kawasaki (JP); Tsuyoshi Matsumoto, Fukuoka (JP); Satoshi Shimizu, Takaoka (JP); Hirohisa Naito, Fuchu (JP); Takuya Masuda, Setagaya (JP)

(73) Assignee: FUJITSU LIMITED, Kawasaki (JP)

( * ) Notice: Subject to any disclaimer, the term of this patent is extended or adjusted under 35 U.S.C. 154(b) by 30 days.

(21) Appl. No.: 16/686,259

(22) Filed: Nov. 18, 2019

(65) Prior Publication Data

US 2020/0078657 A1 Mar. 12, 2020

Related U.S. Application Data

(63) Continuation of application No. PCT/JP2017/018259, filed on May 15, 2017.

(51) Int. Cl.
*A63B 71/06* (2006.01)
*G06T 7/70* (2017.01)
*G06K 9/00* (2006.01)
*G06T 17/00* (2006.01)

(52) U.S. Cl.
CPC .......... *A63B 71/06* (2013.01); *G06K 9/00342* (2013.01); *G06T 7/70* (2017.01); *G06T 17/00* (2013.01); *A63B 2230/62* (2013.01); *G06T 2200/24* (2013.01); *G06T 2207/30196* (2013.01)

(58) Field of Classification Search
None
See application file for complete search history.

(56) References Cited

U.S. PATENT DOCUMENTS

| 2009/0220124 | A1 | 9/2009 | Siegel |
| 2012/0183939 | A1 | 7/2012 | Aragones et al. |
| 2013/0201212 | A1* | 8/2013 | Haskell ................... G06T 17/00 345/632 |

FOREIGN PATENT DOCUMENTS

| JP | 2010-264088 A | 11/2010 |
| JP | 2014-502178 A | 1/2014 |

OTHER PUBLICATIONS

Shin, Jeongeun, and Shinji Ozawa. "A study on motion analysis of an artistic gymnastics by using dynamic image processing—for a development of automatic scoring system of horizontal bar." 2008 IEEE International Conference on Systems, Man and Cybernetics. IEEE, 2008.*

(Continued)

*Primary Examiner* — Frank S Chen
(74) *Attorney, Agent, or Firm* — Fujitsu Patent Center

(57) ABSTRACT

A video reproduction apparatus determines a position of a joint of a performer based on a sensing result by a sensor. The video reproduction apparatus calculates an angle formed by a joint used for scoring an element of an athletic event by using calculation information regarding a calculation formula for calculating the angle and the determined position of the joint of the performer. The video reproduction apparatus displays a performance image of the performer acquired from a camera and a scoring image having the angle displayed on a 3D model image of the performer which is generated according to the sensing result so as to be compared with each other.

6 Claims, 15 Drawing Sheets

(56) References Cited

OTHER PUBLICATIONS

Díaz-Pereira, M. Pino, et al. "Automatic recognition and scoring of Olympic rhythmic gymnastic movements." Human movement science 34 (2014): 63-80.*
Shin, Jrongeun et al.,"A Study on Motion Analysis of an Artistic Gymnastics by using Dynamic Image Processing", IEICE Technical Report, PRMU2008-1 to 18, Pattern Recognition and Media Understanding, vol. 108, No. 46, pp. 13-18, ISSN 0913-5685, cited in International Search Report filed herewith.
International Search Report and Written Opinion of the International Searching Authority, with English Translation, (Form PCT/ISA/210, 220, and 237), mailed in connection with PCT/JP2017/018259 dated Jul. 25, 2017 (14 pages).
EESR—The Extended European Search Report dated Nov. 25, 2020 for European Patent Application No. 17910231.4.

* cited by examiner

FIG.4

| RECORD ID | TIME | X0 | Y0 | Z0 | ... | X17 | Y17 | Z17 |
|---|---|---|---|---|---|---|---|---|
| 001 | 00:00.00 | 100 | 20 | 0 | | 200 | 40 | 5 |
| 001 | 00:00.33 | 101 | 25 | 5 | | 202 | 39 | 15 |
| 001 | 00:00.66 | 110 | 32 | 7 | | 210 | 45 | 12 |
| ... | ... | | | | | | | |
| 001 | 00:10.99 | 201 | 125 | 30 | | 225 | 150 | 10 |

FIG.5

| RECORD ID | EVENT | PLAYER ID | TIME | VIDEO FILE |
|---|---|---|---|---|
| 001 | POMMEL HORSE | 1122 | 00:00.00-00:10.99 | 001_POMMEL HORSE_1122.mp4 |
| 002 | STILL RINGS | 1123 | 00:00.00-00:15.33 | 002_STILL RINGS_1123.mp4 |
| ... | ... | ... | ... | ... |

FIG.6

| SCORING RULE ID | EVENT | ACTION | SCORING TARGET | THRESHOLD (MINOR FAULT, INTERMEDIATE FAULT, MAJOR FAULT) | POINT DEDUCTION (MINOR FAULT, INTERMEDIATE FAULT, MAJOR FAULT) |
|---|---|---|---|---|---|
| 001001 | POMMEL HORSE | LONGITUDINAL CIRCLING | ANGLE DEVIATION IN FINAL PHASE | 15, 30, 45 | 0.1, 0.3, 0.5 |
| 002001 | STILL RINGS | FROM SWING TO STATIC ATTITUDE | LARGEST ANGLE DEVIATION OF SHOULDER POSITION | 15, 30, 45 | 0.1, 0.3, 0.5 |
| 001002 | POMMEL HORSE | ⋮ | ⋮ | ⋮ | ⋮ |
| ⋮ | ⋮ | ⋮ | ⋮ | ⋮ | ⋮ |

FIG.7

| SCORING RULE ID | CALCULATION FORMULA *X0 DENOTES X-COORDINATES OF JOINT 0 | REFERENCE COORDINATES | DISPLAY PLANE | NUMBER OF TIMES OF MEASUREMENTS |
|---|---|---|---|---|
| 001001 | {flag}×asin{($Y_0-Y_2$)/sqrt{($X_0-X_2$)^2+($Y_0-Y_2$)^2}} CIRCLING DIRECTION CW  [flag]=-sign($X_0-X_2$) CIRCLING DIRECTION CCW [flag]=sign($X_0-X_2$) | X2, Y2, Z2 | XY PLANE | 1 |
| 002001 | $\theta_R$=asin{($Z_7-Z_9$)/sqrt{($X_0-X_7$)^2+($Z_9-Z_7$)^2}} $\theta_R$(LARGEST)-$\theta_R$(STATIC ATTITUDE) | X9, Y9, Z9 | YZ PLANE | 2 |

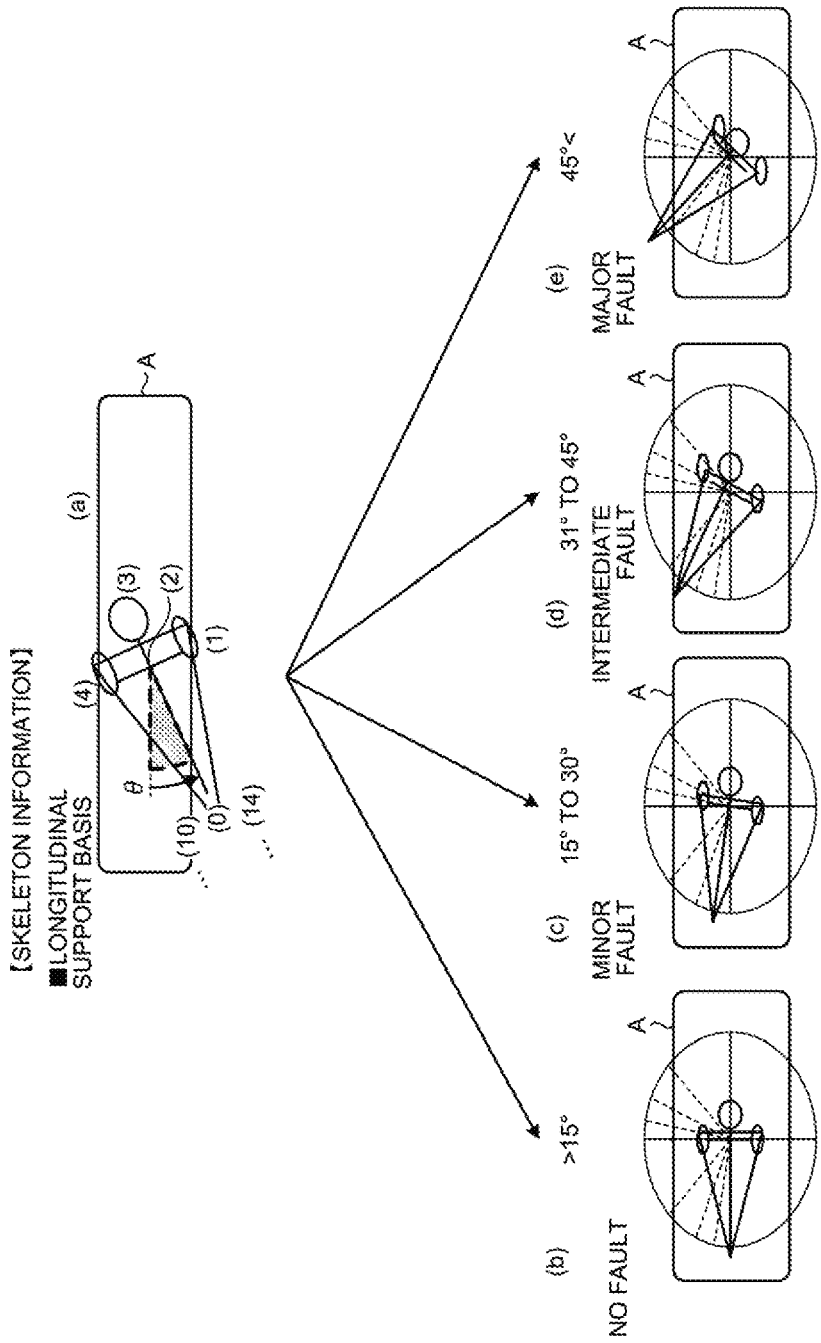

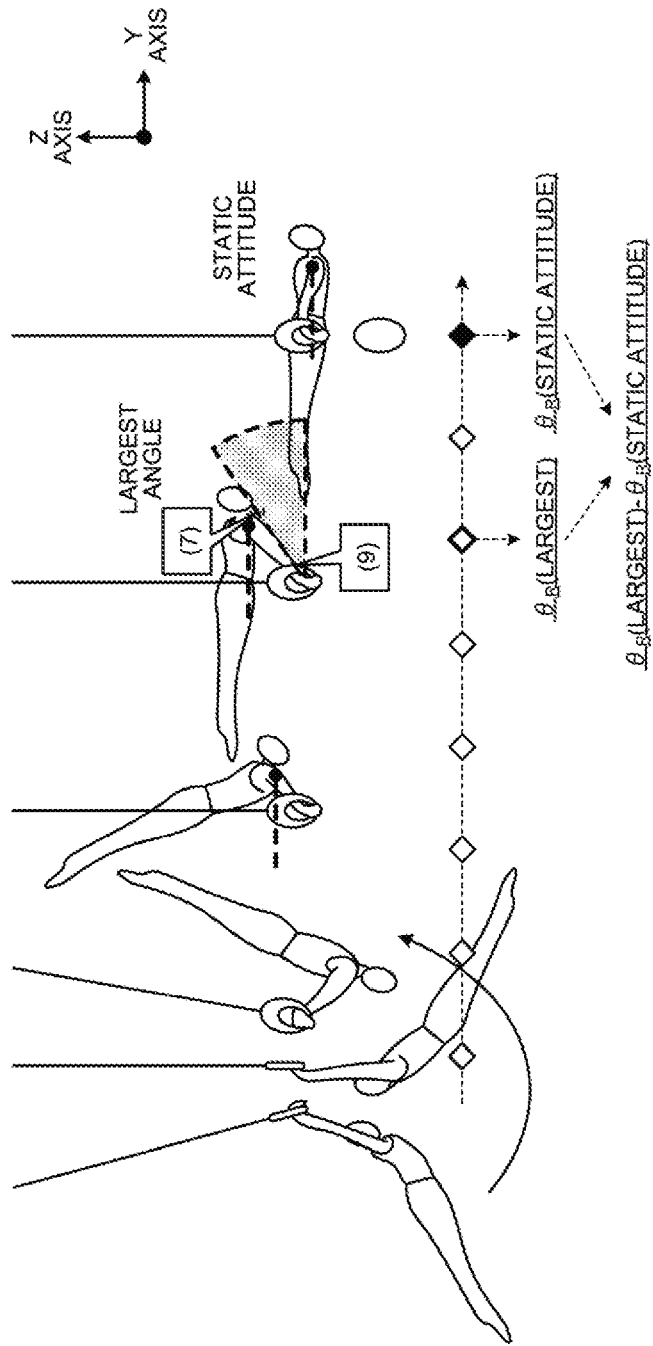

MEDIUM, METHOD, AND APPARATUS FOR DISPLAYING JOINT ANGLE OF PERFORMER FOR SCORING

CROSS-REFERENCE TO RELATED APPLICATION

This application is a continuation application of International Application PCT/JP2017/018259, filed on May 15, 2017, and designating the U.S., the entire contents of which are incorporated herein by reference.

FIELD

The present invention relates to a performance display program, a performance display method, and a performance display apparatus.

BACKGROUND

Conventionally, in sports or the like where a player performs a sequence of elements and a judge gives a score, the success or the degree of perfection of a highly difficult element largely affects a high score or a high rank. For example, six events are formed for men, four events for women, and in events other than vault for men and women, one performance is formed of more than ten elements performed in succession. In a scoring rule, criteria are defined for the type, the group, the number, and the execution of elements, and a criterion is set for each element to determine a score. A judge gives a score to a performance in a short time after the player finishes the performance.

Nowadays, there is a known technology of acquiring information about the attitude, the movement, or the like, of a person by using 3D sensing to assist a sport player, and the like. For example, it is used to check the degree of perfection of an element as it acquires the movement and the like of a gymnast when he performs the element during practice.

Patent Literature 1: Japanese Laid-open Patent Publication No. 2010-264088

SUMMARY

According to an aspect of an embodiment, a non-transitory computer-readable recording medium stores therein a performance display program that causes a computer to execute a process. The process includes determining a position of a joint of a performer based on a sensing result by a sensor; calculating an angle formed by a joint used for scoring an element of an athletic event by using calculation information regarding a calculation formula for calculating the angle and the determined position of the joint of the performer; and displaying a performance image of the performer acquired from a camera and a scoring image having the angle displayed on a 3D model image of the performer which is generated according to the sensing result so as to be compared with each other.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 4 is a diagram that illustrates an example of the information stored in a joint position data DB.

FIG. 5 is a diagram that illustrates an example of the information stored in a video data DB.

FIG. 6 is a diagram that illustrates an example of the information stored in a scoring rule DB.

FIG. 7 is a diagram that illustrates an example of the information stored in a calculation formula DB.

FIG. 8 is a diagram that illustrates an example of calculation of a joint angle in a final phase (front-side support) of pommel horse.

FIG. 9 is a diagram that illustrates an example of calculation of a joint angle during forward upward circling to support at ring height on still rings.

DESCRIPTION OF EMBODIMENTS

It is, however, difficult for even an expert such as a judge to accurately check the joint angle of a player and give a score to the performance in accordance with the scoring rule that is defined for each event or element, and therefore scores vary depending on individual judges.

For example, the body of a gymnast makes a complicated movement in three dimensions, and each gymnast has a different physical size and movement for an element. Therefore, it is not easy for even a judge who is licensed as a judge to give a score after determining, in a short time, that a certain element has been accurately performed in accordance with a scoring rule. For this reason, scores for individual elements sometimes vary depending on a judge and, in some cases, a player expresses an opposition (inquiry) to the judge in a predetermined method so as to make a detailed rejudgement on the score.

According to an aspect, embodiments provide a performance display program, a performance display method, and a performance display apparatus capable of providing information for conducting scoring in the uniform manner in accordance with a scoring rule.

With reference to the drawings, an embodiment of a performance display program, a performance display method, and a performance display apparatus according to the present invention is described below in detail. Furthermore, the present invention is not limited to the embodiment. Moreover, each embodiment may be combined as appropriate as long as the consistency is ensured.

First Embodiment

[Description of Video Reproduction Device]

Figure 1:
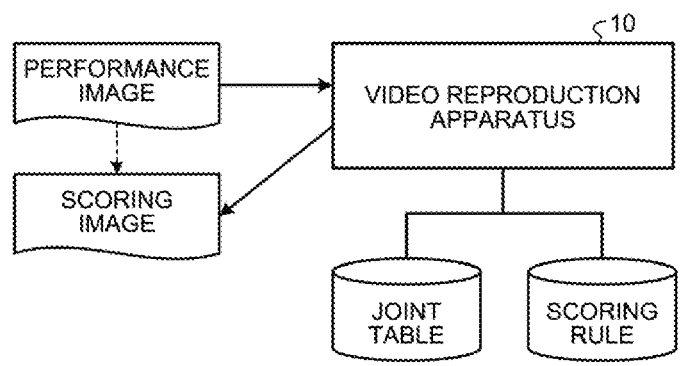
FIG. 1 is a diagram that illustrates a video reproduction apparatus according to a first embodiment.

FIG. 1 is a diagram that illustrates a video reproduction apparatus 10 according to a first embodiment. The video reproduction apparatus 10 illustrated in FIG. 1 is an example of a computer, such as a server, a tablet terminal, or a smartphone, and it is an example of a performance display apparatus. The video reproduction apparatus 10 uses a 3D (Three Dimensions) laser sensor to determine the movement or the position of a joint of a player in three dimensions and in chronological order and stores it as joint position data in a joint table in advance. Furthermore, the video reproduction apparatus 10 obtains, as a rule, the scoring rule for each athletic event and registers it in a database so as to generate, as indexes, the type of element, the joint and the angle used for scoring an element, a point deduction due to angle deviation, or the like.

The above video reproduction apparatus 10 is used for the judge to view the video, check the score, and make a rejudgement in the case of an opposition to the score announced after the performance ends. Specifically, the video reproduction apparatus 10 stores calculation information regarding a calculation formula for calculating the angle formed by a joint used for scoring an element in an athletic event. Then, the video reproduction apparatus determines the position of a joint of the performer from the performance image that is a specific frame designated in the performance video of the performer captured by a video camera. Then, the video reproduction apparatus 10 calculates the angle formed by a joint by using the determined position of the joint of the performer and the calculation information and displays the performance image designated in the performance video and the scoring image having the angle displayed on the performance image so as to be compared with each other.

Specifically, the video reproduction apparatus 10 not only simply visualizes the movement and the position of each joint during the performance while determining the attitude and the movement of the performer due to 3D sensing with the 3D laser sensor but also presents, to a judge, the information that aids in making a determination for scoring the execution of the element in accordance with a scoring rule. As a result, the video reproduction apparatus 10 is capable of providing the information for conducting scoring in the uniform manner in accordance with the scoring rule.

[Functional Configuration]

Figure 2:
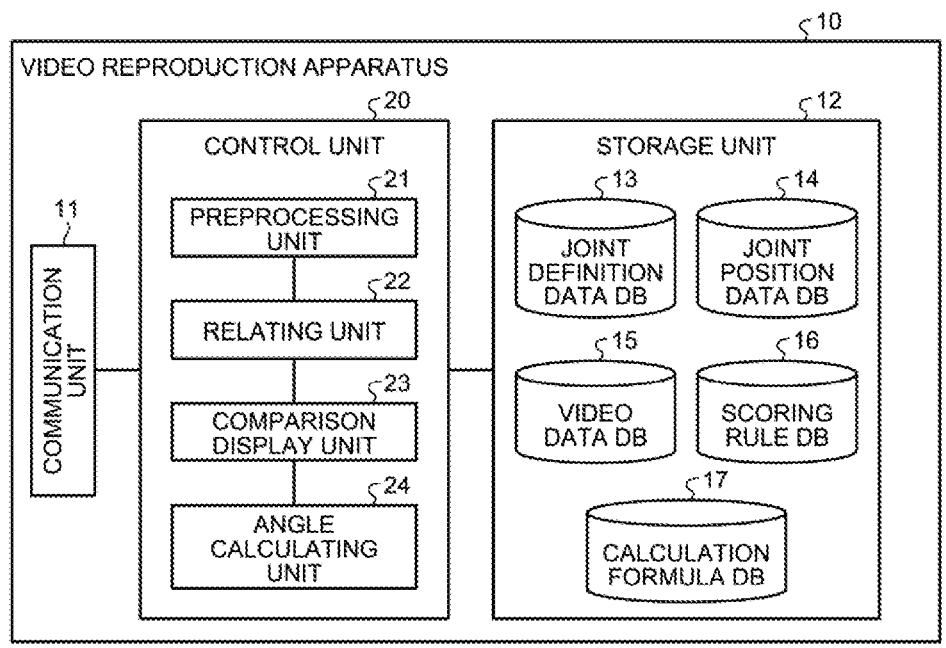
FIG. 2 is a functional block diagram that illustrates a functional configuration of the video reproduction apparatus according to the first embodiment.

FIG. 2 is a functional block diagram that illustrates a functional configuration of the video reproduction apparatus 10 according to the first embodiment. As illustrated in FIG. 2, the video reproduction apparatus 10 includes a communication unit 11, a storage unit 12, and a control unit 20.

The communication unit 11 is a communication interface, or the like, which controls communications with other devices. For example, the communication unit 11 receives a performance video captured by a video camera and receives a performance video captured by a video camera. Furthermore, the communication unit 11 receives joint position data that is a result of 3D sensing with a 3D laser sensor. Moreover, the communication unit 11 receives a scoring rule from the administrator's terminal, or the like.

The storage unit 12 is an example of a storage device that stores a program and data, and it is, for example, a memory or a hard disk. The storage unit 12 stores a joint definition data DB 13, a joint position data DB 14, a video data DB 15, a scoring rule DB 16, and a calculation formula DB 17. Furthermore, the calculation formula DB 17 is an example of a scoring storage unit.

The joint definition data DB 13 is a database that stores definition information for determining each joint in a skeleton model. The definition information stored here may be measured for each performer during 3D sensing with a 3D laser sensor or may be defined by using a skeleton model of the typical body.

Figure 3:
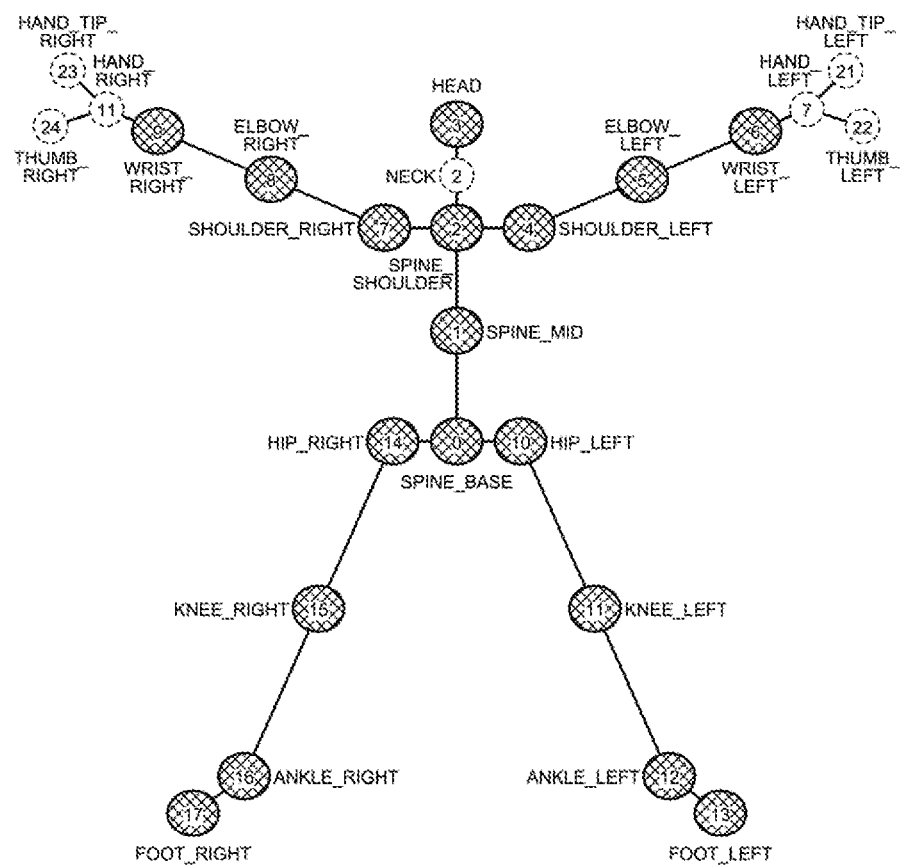
FIG. 3 is a diagram that illustrates an example of the information stored in a joint definition data DB.

FIG. 3 is a diagram that illustrates an example of the information stored in the joint definition data DB 13. As illustrated in FIG. 3, the joint definition data DB 13 stores the information on numbering of each joint determined by using a known skeleton model. For example, as illustrated in FIG. 3, number 7 is assigned to the right shoulder joint (SHOULDER_RIGHT), number 5 is assigned to the left elbow joint (ELBOW_LEFT), number 11 is assigned to the left knee joint (KNEE_LEFT), and number 14 is assigned to the right hip joint (HIP_RIGHT). Here, according to the embodiment, the X-coordinate of the number-7 right shoulder joint is sometimes described as X7, the Y-coordinate as Y7, and the Z coordinate as Z7. Furthermore, numbers in a dotted line are of a joint, or the like, which are not used for scoring although they are determined from the skeleton model.

The joint position data DB 14 is a database that stores the position data on each joint acquired from video data on the performer and temporal changes in the joint position data. FIG. 4 is a diagram that illustrates an example of the information stored in the joint position data DB 14. As illustrated in FIG. 4, the joint position data DB 14 stores "record ID, time, X0, Y0, Z0, . . . , X17, Y17, Z17" in a related manner. "Record ID" stored here is the information for identifying video data, and "time" is the time when the positional information on a joint is determined. "X0, Y0, 20, . . . , X17, Y17, 217" are the XYZ coordinates of each joint, and "X0, Y0, 20" are the coordinates of the joint with number 0 illustrated in FIG. 3.

FIG. 4 illustrates temporal changes in each joint in the video data with number 001, and it indicates that, at the time "00:00:00", the positions of the respective joints are "X0=100, Y0=20, Z0=0, . . . , X17=200, Y17=40, Z17=5". Furthermore, it indicates that, at the time "00:00:33", the positions of the respective joints have moved to "X0=101, Y0=25, Z0=5, . . . , X17=202, Y17=39, Z17=15".

The video data DB 15 is a database that stores video data on a performer. FIG. 5 is a diagram that illustrates an example of the information stored in the video data DB 15. As illustrated in FIG. 5, the video data DB 15 stores "record ID, event, player ID, time, video file" in a related manner. "Record ID" stored here is the information for identifying video data, "event" indicates the event of a performer captured by the video camera, "player ID" is the information for identifying a performer, "time" is the information indicating a performance time, and "video file" is the information for determining video data. The case of FIG. 5 indicates that the video file "001_pommel horse_1122.mp4" with the record ID "001" is the video data on "pommel horse" performed by the player with the player ID "1122" and it is the performance data in "10 minutes 99 seconds".

The scoring rule DB 16 is a database that stores a scoring rule for each event. FIG. 6 is a diagram that illustrates an example of the information stored in the scoring rule DB 16. As illustrated in FIG. 6, the scoring rule DB 16 stores "scoring rule ID, event, action, scoring target, threshold (minor fault, intermediate fault, major fault), point deduction (minor fault, intermediate fault, major fault)" in a related manner.

"Scoring rule ID" stored here is the information for identifying a scoring rule. "Event" is the information for determining the target event to be scored. "Action" is the information for determining the target action to be scored. "Scoring target" is the information for determining the element name, the score item, or the like, for which the angle, which is the target to be scored, is calculated. "Threshold (minor fault, intermediate fault, major fault)" is the information indicating a threshold for the angle that is the target for point deduction. "Point deduction (minor fault, intermediate fault, major fault)" is the information indicating the details of point deduction.

In the case of FIG. 6, the scoring rule ID "001001" indicates that "angle deviation" in "final phase" of "longitudinal circling" of "pommel horse" is the scoring target. This example indicates that a judgement is made such that point deduction is "0.1" in the range of the angle from 15° (15 degrees) to 30°, point deduction is "0.3" in the range of the angle from 31° to 45°, and point deduction is "0.5" when the angle is more than 45°.

The calculation formula DB 17 is a database that stores a calculation formula for the angle between joints, which is the target to be scored, i.e., the angle formed by joints. FIG. 7 is a diagram that illustrates an example of the information stored in the calculation formula DB 17. As illustrated in FIG. 7, the calculation formula DB 17 stores "scoring rule ID, calculation formula, reference coordinates, display plane, number of times of measurements" in a related manner. "Scoring rule ID" stored here is the information for identifying a scoring rule. "Calculation formula" is a calculation formula for the target angle to be scored. "Reference coordinates" are coordinates that serve as the reference for displaying the angle. "Display plane" is a plane for displaying the calculated angle. "Number of times of measurements" is the number of times of calculations per scoring.

In the example of FIG. 7, the scoring rule ID "001001" indicates that the reference coordinates are of the joint with number 2 and the value of "flag" dynamically changes in cases where the direction of circling is in a clockwise direction (CW) and in a counterclockwise direction (CCW). Furthermore, it indicates that, for the display, it is displayed on the XY plane and the number of times of measurements is one.

Furthermore, the scoring rule ID "002001" indicates that the reference coordinates are of the joint with number 9 and the difference between the largest value and the smallest value (static attitude) of $\theta_R$ is the scoring target. Furthermore, it indicates that the number of times of measurements is twice as the largest value and the smallest value (static attitude) of $\theta_R$ are calculated and, for the display, it is displayed on the YZ plane.

The control unit 20 is a processing unit that controls the overall video reproduction apparatus 10, and it is for example a processor. The control unit 20 includes a preprocessing unit 21, a relating unit 22, a comparison display unit 23, and an angle calculating unit 24. Furthermore, the preprocessing unit 21, the relating unit 22, the comparison display unit 23, and the angle calculating unit 24 are examples of an electronic circuit such as a processor or examples of a process executed by a processor. Moreover, the angle calculating unit 24 is an example of a determining unit and a calculating unit, and the comparison display unit 23 is an example of a display control unit.

The preprocessing unit 21 is a processing unit that previously acquires definition information on a joint. Specifically, the preprocessing unit 21 measures a joint of the performer during 3D sensing with the 3D laser sensor. Then, the preprocessing unit 21 numbers the joint of the performer in accordance with the typical skeleton model and stores it in the joint position data DB 14.

Furthermore, the preprocessing unit 21 acquires the performance video of the performer captured by using the video camera and stores it as video data in the storage unit 12. Furthermore, the preprocessing unit 21 executes 3D sensing with the 3D laser sensor on the performance captured by using the video camera to acquire temporal changes in the joint position data on the performer and stores it in the storage unit 12.

The relating unit 22 is a processing unit that relates the performance video with the joint position data during the performance. For example, the relating unit 22 assigns the record ID for relating the video data acquired by the preprocessing unit 21 and the joint position data on the performer acquired from the video data. Then, the relating unit 22 relates the record ID with the information for determining the video data and stores them in the video data DB 15 and relates the record ID with the joint position data and stores them in the joint position data DB 14.

The comparison display unit 23 is a processing unit that displays the video data on the performance and the joint position data in the video data so as to be compared with each other. Specifically, the comparison display unit 23 divides the video data into each frame (performance image) and displays it. Furthermore, the comparison display unit 23 acquires the joint position data corresponding to each frame from the joint position data DB 14, applies it to the skeleton model to generate a 3D model, and displays the generated 3D model. Specifically, the comparison display unit 23 displays the specific frame selected by the judge or the like from the frames forming the video data alongside of the 3D model of the joint position data on the performer at that point.

The angle calculating unit 24 is a processing unit that calculates the angle, which is the target to be scored, with respect to the 3D model of the joint position data on the performer corresponding to the selected frame and displays it on the 3D model. Specifically, the angle calculating unit 24 determines the event in the selected frame from the video data DB 15 and determines the scoring rule corresponding to the determined event from the scoring rule DB 16. Here, when multiple scoring rules are determined, the angle calculating unit 24 prompts the judge or the like to select the scoring rule to be applied. Then, the angle calculating unit 24 determines the calculation formula corresponding to the selected scoring rule from the calculation formula DB 17 and, by using the determined calculation formula, calculates the target angle to be scored.

For example, in a case where the scoring rule "001001" is selected, the angle calculating unit 24 calculates the angle by using the calculation formula in the first line of FIG. 7. The angle calculated by the calculation formula is the angle obtained from the positions of the chest and the waist in the "final phase" of the longitudinal circling of pommel horse, and it is calculated based on the coordinates with the joint number 2 and the coordinates with the joint number 0. Then, the angle calculating unit 24 causes the calculated angle to be displayed on the XY plane of the 3D model.

FIG. 8 is a diagram that illustrates an example of the calculation of the joint angle in the final phase (front-side support) of pommel horse. In the example illustrated in FIG.

8, the longitudinal support is a basis. As illustrated in FIG. 8(a), the angle of the target joint to be scored in the final phase is an angle θ formed between the straight line connecting the chest (the joint number 2) and the waist (the joint number 0) and the horizontal direction of a base A of the pommel horse. The angle θ is calculated by the calculation formula in the first line of FIG. 7. Furthermore, it is determined that there is no fault and a point deduction is 0 when the angle θ is less than 15° (FIG. 8(b)), it is determined that there is a minor fault and a point deduction is 0.1 points when the angle θ is between 15° and 300 (FIG. 8(c)), it is determined that there is an intermediate fault and a point deduction is 0.3 points when the angle θ is between 31° and 45° (FIG. 8(d)), and it is determined that there is a major fault and a point deduction is 0.5 points when the angle θ is more than 45° (FIG. 8(e)).

Another example is described; the angle calculating unit 24 calculates the angle by using the calculation formula in the second line of FIG. 7 in a case where the scoring rule "002001" is selected. The angle calculated by this calculation formula is the difference between the largest angle and the smallest angle (static attitude) of the "shoulder position" from the swing on still rings to the static attitude, and it is calculated based on the coordinates of the joint number 9 and the coordinates of the joint number 7. Then, the angle calculating unit 24 causes the calculated angle to be displayed on the YZ plane of the 3D model.

FIG. 9 is a diagram that illustrates an example of the calculation of the joint angle during forward upward circling to support at ring height on still rings. As illustrated in FIG. 9, the angle $\theta_R$ of the target joint to be scored during forward upward circling to support at ring height on still rings is the angle formed between the straight line connecting the right shoulder (the joint number 9) and the right hand (the joint number 7) and the direction (Y direction) horizontal to the ground. The angle $\theta_R$ is calculated by the calculation formula in the second line of FIG. 7. As illustrated in the second line of FIG. 7, the number of times of calculations for the angle $\theta_R$ is twice. This is because the difference between the largest angle and the smallest angle is the target to be scored.

Specifically, the angle calculating unit 24 calculates the largest angle $\theta_R$ from the frame that is designated by the judge as the target for determining the largest angle and calculates the angle $\theta_R$ at the stationary time from the frame that is designated by the judge as the target for determining the static attitude. Then, the difference is the target to be scored. For example, it is determined that there is no fault and a point deduction is 0 when the difference between the largest angle $\theta_R$ and the angle $\theta_R$ at the stationary time is less than 15°, it is determined that there is a minor fault and a point deduction is 0.1 points when the difference is between 15° and 30°, it is determined that there is an intermediate fault and a point deduction is 0.3 points when the difference is between 31° and 45°, and it is determined that there is a major fault and a point deduction is 0.5 points when the difference is more than 45°.

[Screen Display Example]

Figure 10:
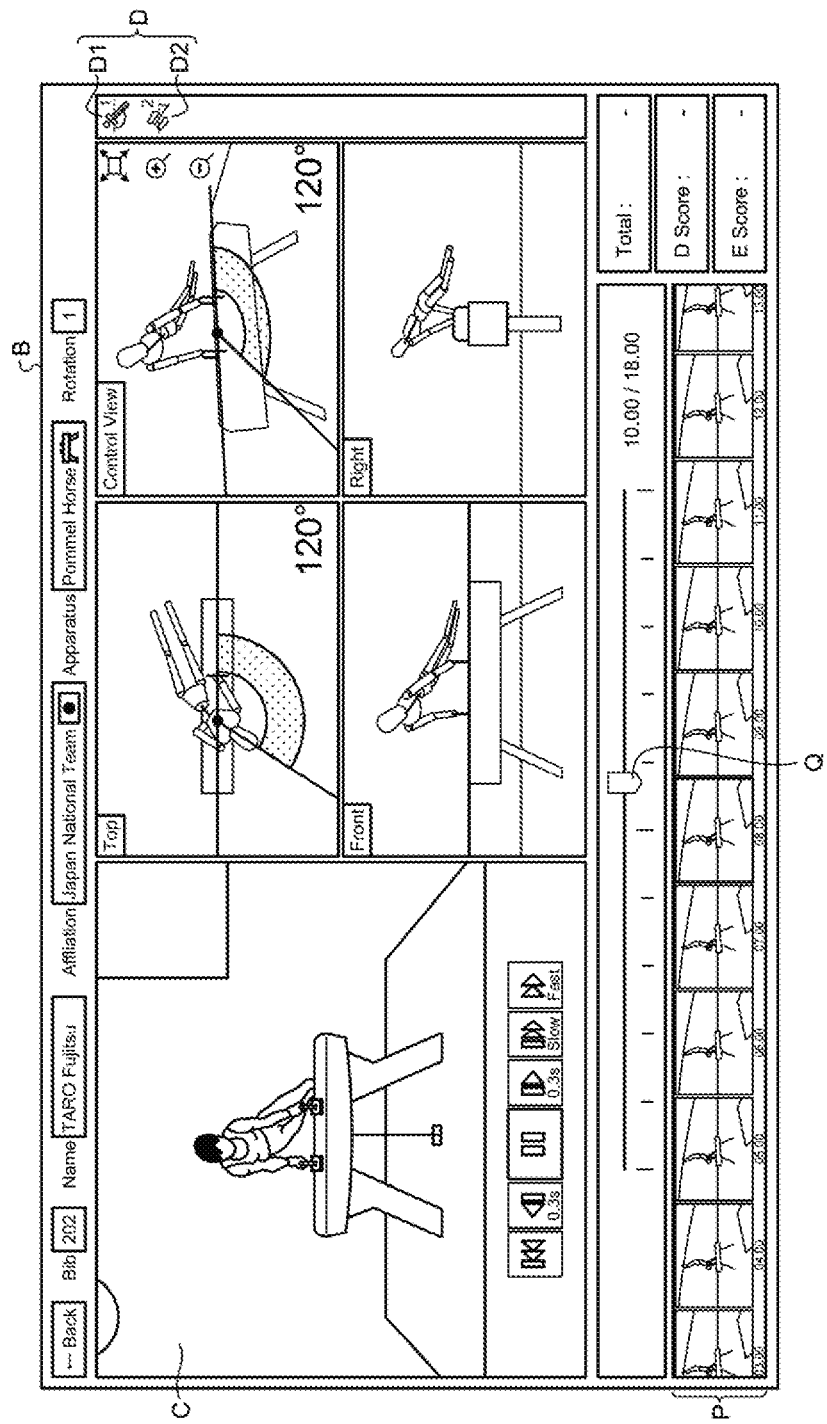
FIG. 10 is a diagram that illustrates a display example of an output screen.

Next, an example of the screen display presented on the display, or the like, by the comparison display unit 23 is described. FIG. 10 is a diagram that illustrates a display example of the output screen. The comparison display unit 23 generates and displays a comparison display screen B illustrated in FIG. 10. The comparison display screen B includes information such as the name of a performer, the team he belongs to, or the event performed. The comparison display screen B includes a video area C for displaying the image of a selected frame, a selection area D for displaying a scoring rule in a selectable manner, an area P for displaying each frame, and a scroll bar Q for selecting a frame. Furthermore, the XYZ plane is previously determined on the screen. For example, in the case of pommel horse, it is determined that the horizontal direction of the pommel horse is the X axis, the vertical direction is the Y axis, and the depth direction is the Z axis.

Specifically, the comparison display unit 23 displays the video (image) corresponding to the frame selected by the judge on the video area C of the comparison display screen B. Furthermore, the comparison display unit 23 displays the image of each frame forming the video data on the area P of the comparison display screen B. Moreover, the comparison display unit 23 displays, on the area C, the image of the frame selected from the frames displayed on the area P by a user, such as a judge, moving the scroll bar Q.

Furthermore, the comparison display unit 23 displays the skeleton model corresponding to the image of the frame displayed on the video area C alongside of the image in the video area C. Here, the comparison display unit 23 displays images of the skeleton model viewed from multiple viewpoints that are previously determined. Furthermore, the angle calculating unit 24 uses the calculation formula for the scoring rule selected from the scoring rules displayed on the selection area D to display the angle on each image of the skeleton model displayed. That is, the judge selects the scoring rule displayed on the selection area D so as to display the desired angle.

For example, when the judge selects the frame in 08 seconds and a scoring rule D1, the comparison display unit 23 displays the image of the frame in 08 seconds on the area C and displays the skeleton model for the image. Then, the angle calculating unit 24 acquires the joint position data corresponding to the frame from the joint position data DB 14, calculates the target angle to be scored by using the calculation formula corresponding to the scoring rule D1, and then displays it by being superimposed on the displayed image of the skeleton model.

Then, when the judge selects the frame in 09 seconds while maintaining the scoring rule D1, the comparison display unit 23 displays the image of the frame in 09 seconds on the area C and displays the skeleton model for the image. Then, the angle calculating unit 24 displays the angle calculated by using the joint position data corresponding to the frame by being superimposed on the displayed image of the skeleton model.

Furthermore, when the judge selects a scoring rule D2 while selecting the frame in 09 seconds, the comparison display unit 23 maintains the display, and the angle calculating unit 24 acquires the joint position data corresponding to the frame from the joint position data DB 14, calculates the target angle to be scored by using the calculation formula corresponding to the scoring rule D2, and then displays it by being superimposed on the displayed image of the skeleton model.

Furthermore, in a case where a single frame is selected, the angle calculating unit 24 may previously calculate the angle with regard to the previous and the next frames. For example, when the frame in 08 seconds is selected, the angle calculating unit 24 may also calculate the angle using the skeleton model of the frame in 07 seconds and the angle using the skeleton model of the frame in 09 seconds in addition to the angle using the skeleton model of the frame in 08 seconds.

Thus, the previous calculation allows a decrease in the time to calculate the angle due to frame switching and a reduction in the workload of the judge. Furthermore, even in a case where the judge checks angles by frequently switching frames, the checking task may be performed without stress.

Figure 11:
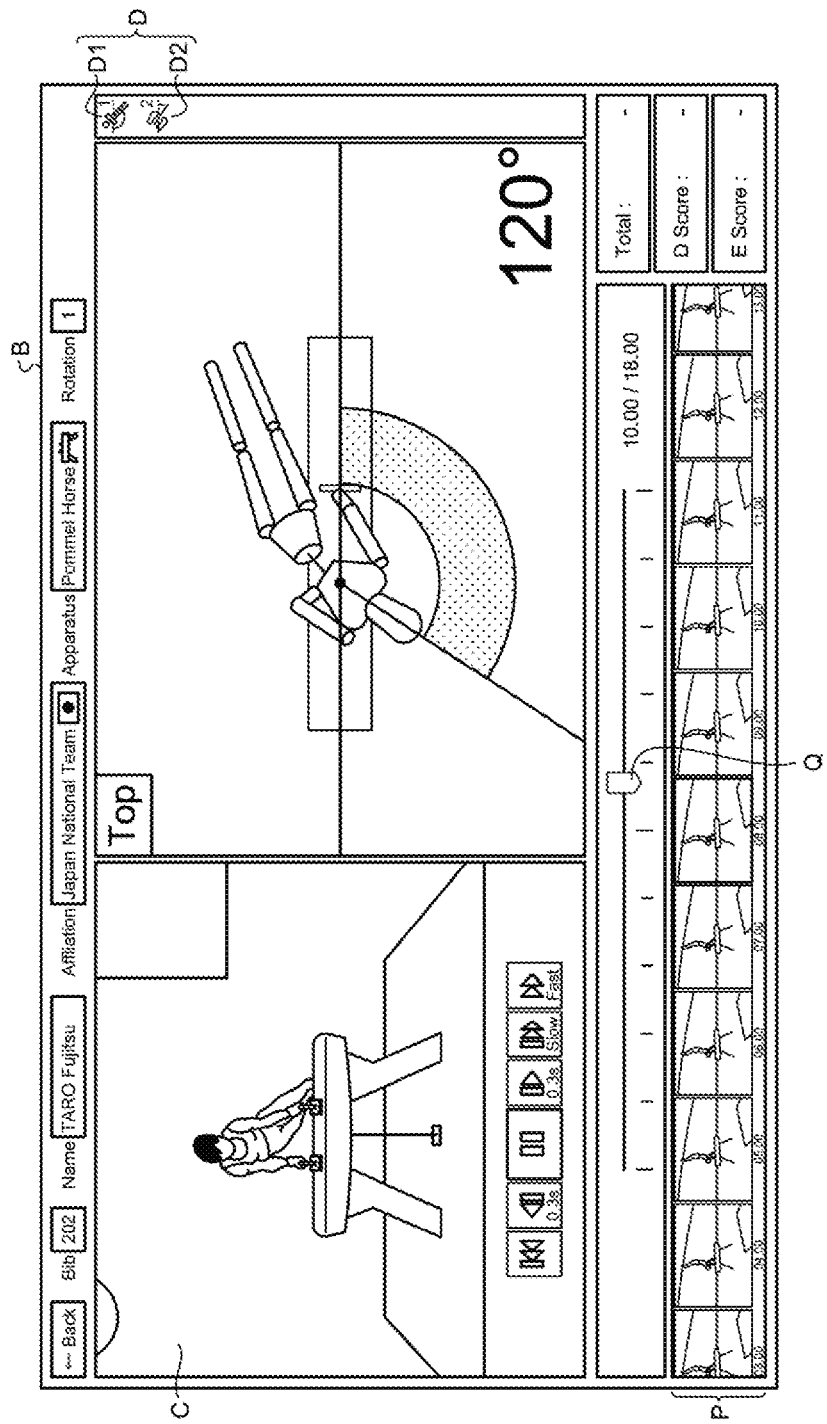
FIG. 11 is a diagram that illustrates a display example of an enlarged display.

Furthermore, the comparison display unit 23 may also display, in an enlarged manner, the image of the skeleton model selected by double click or the like from multiple images of the skeleton model. FIG. 11 is a diagram that illustrates a display example of the enlarged display. As illustrated in FIG. 11, in a case where the image of the skeleton model on the top is selected in the state of FIG. 10, the comparison display unit 23 displays the image of the skeleton model on the top in an enlarged manner. Furthermore, the selection of a frame may be executed by pressing the button displayed under the area B.

Figure 12:
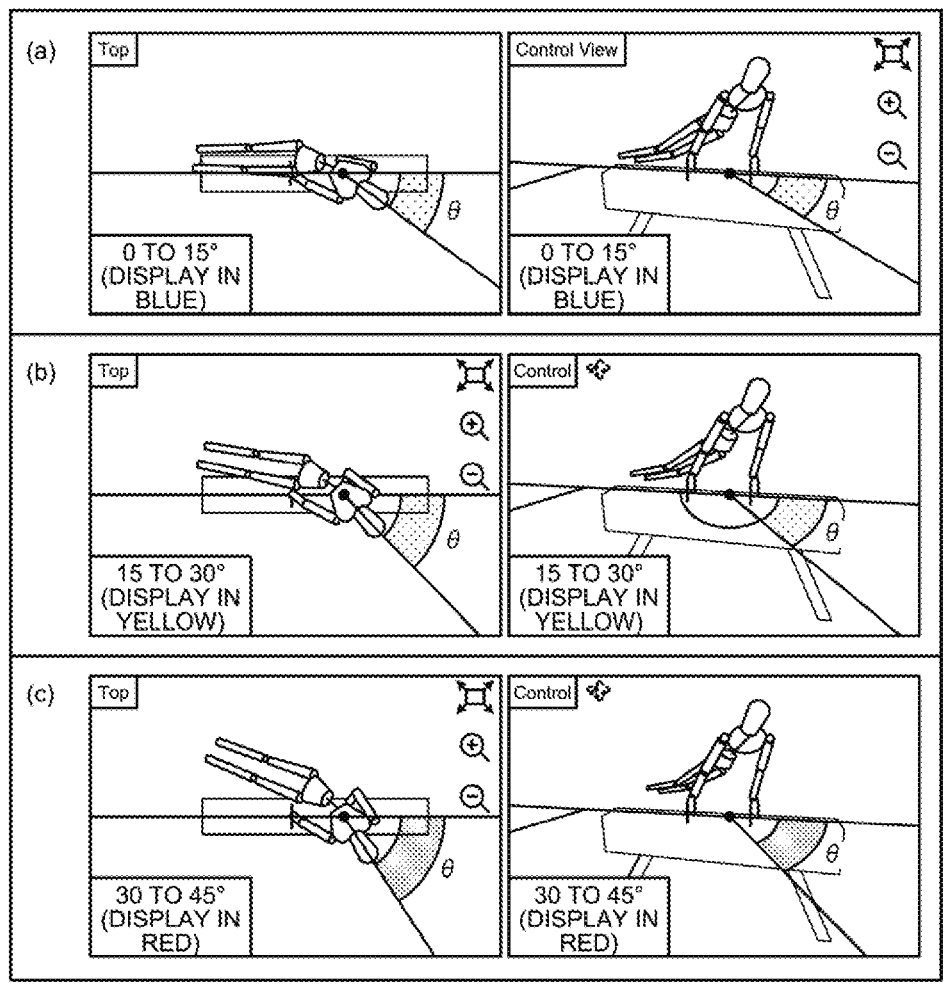
FIG. 12 is a diagram that illustrates a display example of point deduction.

Furthermore, the angle calculating unit 24 may also change the display format of the angle in accordance with the degree of point deduction. FIG. 12 is a diagram that illustrates a display example of point deduction. For example, the angle calculating unit 24 displays the angle in blue in the case of a minor fault (FIG. 12(a)), displays the angle in yellow in the case of an intermediate fault (FIG. 12(b)), and displays the angle in red in the case of a major fault (FIG. 12(c)). This makes it possible to visually display the degree of point deduction and to reduce the workload of the judge. Furthermore, the colors may be optionally changed.

[Flow of Preprocessing]

Figure 13:
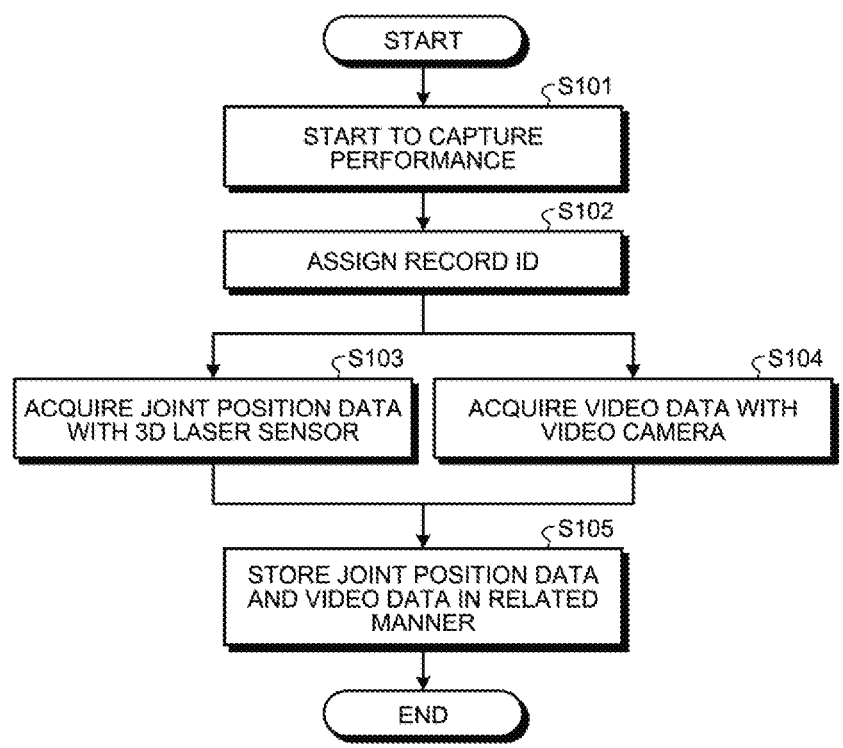
FIG. 13 is a flowchart that illustrates the flow of preprocessing.

FIG. 13 is a flowchart that illustrates the flow of preprocessing. As illustrated in FIG. 13, the preprocessing unit 21 receives an instruction to start to capture a performance (S101) and then assigns a record ID (S102). Then, the preprocessing unit 21 acquires joint position data with the 3D laser sensor (S103) while acquiring video data with the video camera (S104).

Then, the relating unit 22 relates the joint position data with the video data and stores them in the joint position data DB 14 and the video data DB 15, respectively (S105). Furthermore, the timing in which the record ID is assigned may be optionally changed.

[Flow of Process to Register Joint Position]

Figure 14:
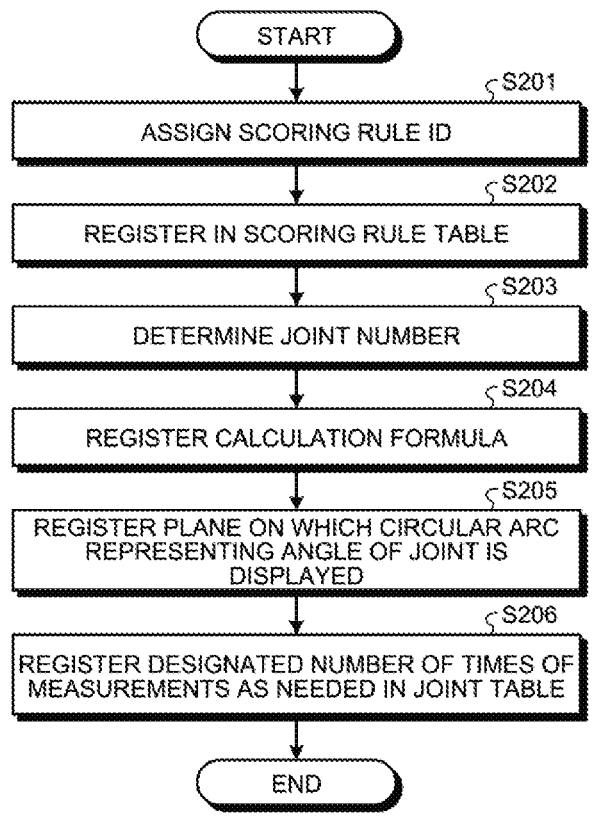
FIG. 14 is a flowchart that illustrates the flow of a process to register a joint position.

FIG. 14 is a flowchart that illustrates the flow of a process to register a joint position. As illustrated in FIG. 14, the preprocessing unit 21 assigns the scoring rule ID (S201), receives, from the administrator or the like, points (action, scoring target, threshold, point deduction, or the like) checked by the gymnastics judge during scoring, and registers them in the scoring rule DB 16 for each athletic event (S202).

Then, the preprocessing unit 21 determines the joint number related to the skeleton model for each scoring rule ID (S203) and registers the calculation formula for calculating the angle formed by a joint, received from the administrator or the like, in the calculation formula DB 17 (S204).

Then, the preprocessing unit 21 receives, from administrator or the like, the designation of the plane on which the circular arc representing the angle of the joint is displayed and sets it in the calculation formula DB 17 (S205). Then, in a case where the formed angles at multiple times are used for scoring, the preprocessing unit 21 receives, from the administrator or the like, the designation of the number of times of measurements as needed and registers it in the calculation formula DB 17 (S206).

[Flow of Comparison Display Process]

Figure 15:
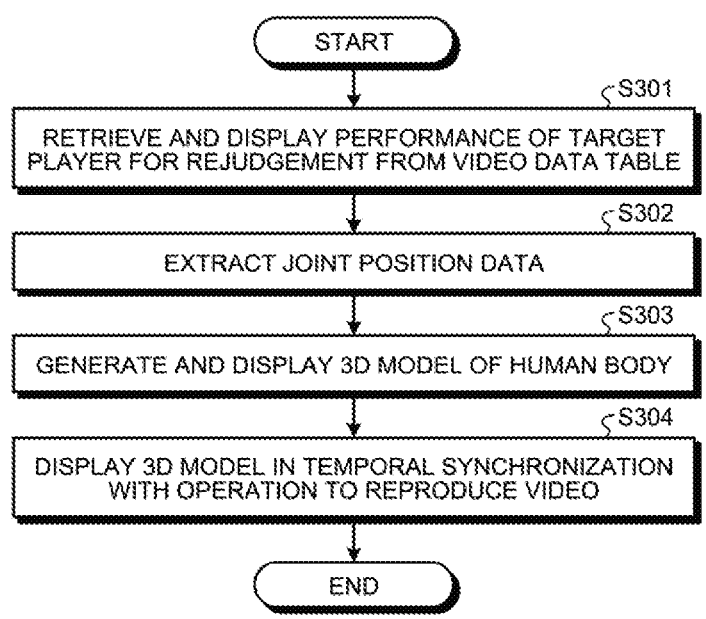
FIG. 15 is a flowchart that illustrates the flow of a comparison display process.

FIG. 15 is a flowchart that illustrates the flow of a comparison display process. As illustrated in FIG. 15, the comparison display unit 23 retrieves the video data on the performance of the player for a rejudgement from the video data DB 15 and displays it (S301). Furthermore, the performance of the player for a rejudgement may be designated by the administrator or the like.

Then, the comparison display unit 23 extracts the joint position data related to the record ID of the retrieved video data from the joint position data DB 14 (S302). Then, the comparison display unit 23 applies the extracted joint position data to a skeleton model to generate a 3D model of the human body and displays it (S303). Then, the comparison display unit 23 displays the 3D model in temporal synchronization with the operation to reproduce the video data (S304).

[Flow of Process to Display Angle]

Figure 16:
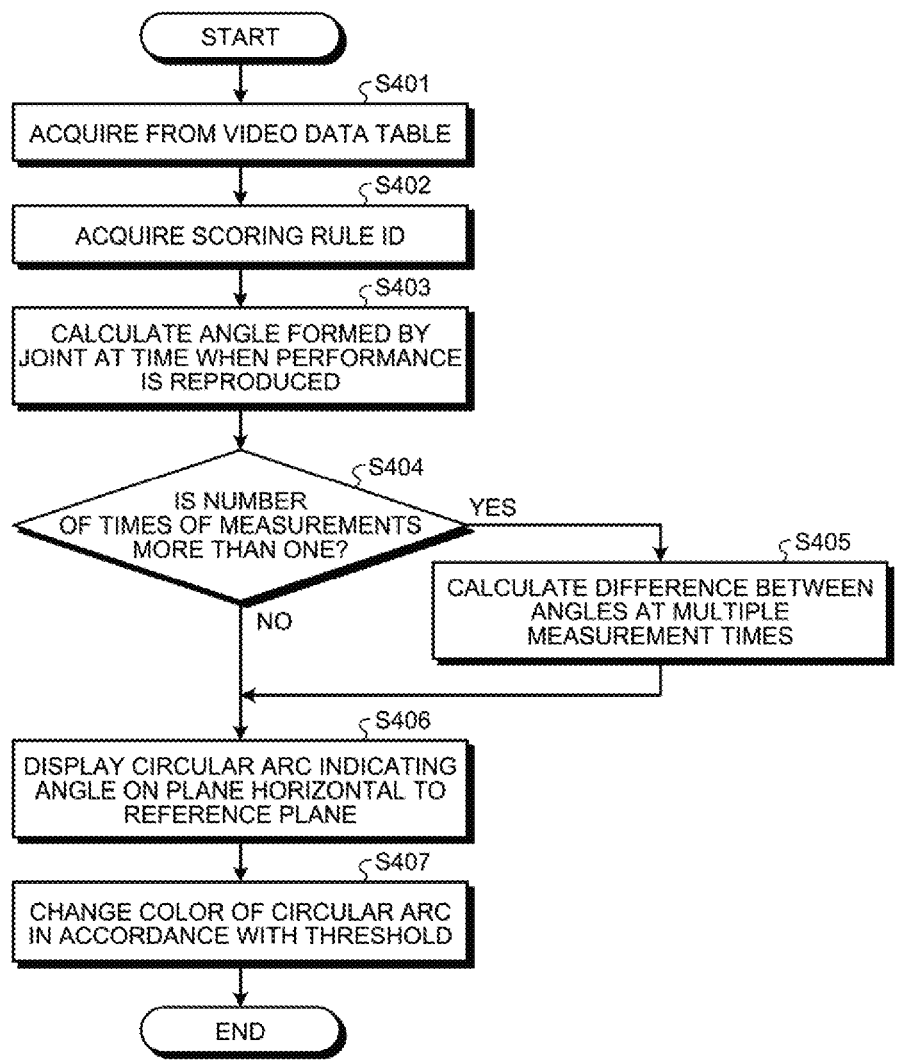
FIG. 16 is a flowchart that illustrates the flow of a process to display an angle formed by a joint.

FIG. 16 is a flowchart that illustrates the flow of a process to display the angle formed by a joint. As illustrated in FIG. 16, the angle calculating unit 24 acquires the event name with the record ID that is the target to be determined from the video data DB 15 (S401) and acquires the scoring rule ID regarding the event from the scoring rule DB 16 (S402).

Then, the angle calculating unit 24 retrieves the calculation formula for each acquired scoring rule ID from the calculation formula DB 17 and calculates the angle formed by a joint at the time when the performance is reproduced (S403). Here, in a case where the number of times of measurements is set to be more than one (S404: Yes), the angle calculating unit 24 calculates the difference between the angles at multiple measurement times in accordance with the calculation formula (S405).

Furthermore, in a case where the number of times of measurements is set to be not more than one (S404: No) or S405 is executed, the angle calculating unit 24 displays the circular arc indicating the angle on the plane horizontal to the reference plane by using the reference coordinates for the calculation formula DB 17 as an origin in the displayed 3D model in conjunction with the selection button (S406). Furthermore, the angle calculating unit 24 changes the color of the circular arc in accordance with a threshold (S407).

Advantageous Effect

As described above, as the video reproduction apparatus 10 calculates the joint angle of a player for a gymnastics judge in accordance with a calculation formula and displays it, it is possible to provide information for conducting scoring in the uniform manner in accordance with a scoring rule. As a result, a gymnastics judge is capable of scoring a performance in a detailed manner in accordance with a scoring rule defined for each event or element without depending on the individual's habit, capability, experience, or the like.

Although the embodiment of the present invention is described above, the present invention may be implemented in various different embodiments other than the above-described embodiment. Hence, a different embodiment is described below.

[Athletic Event]

Although the gymnastics such as pommel horse and still rings are described as examples in the above embodiment, these are not limitations, and other sports are also applicable, in which a player performs a sequence of elements and a judge gives a score. Examples of the other sports are other events of gymnastics, figure skating, rhythmic gymnastics, or cheerleading.

[Target Data]

Although the example using a video of the performance is described above, this is not a limitation. For example, still images may be processed in the same manner. Furthermore, a typical 3D modeling technology may be used as the technology for acquiring the three-dimensional coordinates of each joint from the skeleton model.

[System]

The processing procedure, the control procedure, the specific name, and information including various types of data and parameters mentioned in the above descriptions and drawings may be optionally changed if not otherwise specified. Furthermore, each component of each device illustrated is conceptual in terms of functionality and does not need to be physically configured as illustrated in the drawings. Specifically, specific forms of separation and combination of each device are not limited to those depicted in the drawings. A configuration may be such that all or some of them are functionally or physically separated or combined in an arbitrary unit depending on various types of loads, usage, or the like. Furthermore, all or any of each processing function performed by each device may be implemented by a CPU and a program analyzed and executed by the CPU or may be implemented as a wired logic hardware.

[Hardware Configuration]

Figure 17:
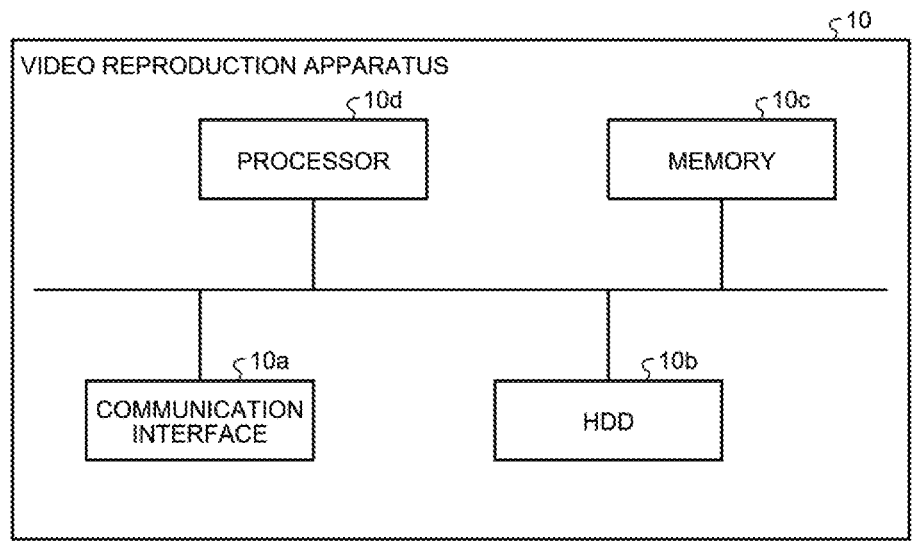
FIG. 17 is a diagram that illustrates an example of a hardware configuration.

FIG. 17 is a diagram that illustrates an example of a hardware configuration. As illustrated in FIG. 17, the video reproduction apparatus 10 includes a communication interface 10a, an HDD (Hard Disk Drive) 10b, a memory 10c, and a processor 10d.

The communication interface 10a is a network interface card, or the like, which controls communications with other devices. The HDD 10b is an example of a storage device that stores a program or data.

Examples of the memory 10c include a RAM (Random Access Memory) such as an SDRAM (Synchronous Dynamic Random Access Memory), a ROM (Read Only Memory), or a flash memory. Examples of the processor 10d are a CPU (Central Processing Unit), a DSP (Digital Signal Processor), an FPGA (Field Programmable Gate Array), or a PLD (Programmable Logic Device).

Furthermore, the video reproduction apparatus 10 operates as an information processing apparatus that reads and executes a program to implement a video reproduction method. Specifically, the video reproduction apparatus 10 executes a program for performing the same functions as those of the preprocessing unit 21, the relating unit 22, the comparison display unit 23, and the angle calculating unit 24. As a result, the video reproduction apparatus 10 may execute a process for performing the same functions as those of the preprocessing unit 21, the relating unit 22, the comparison display unit 23, and the angle calculating unit 24. Moreover, the program described in this different embodiment is not exclusively performed by the video reproduction apparatus 10. For example, the present invention is also applicable to a case where the program is executed by a different computer or server or a case where the program is executed by them in cooperation.

The program may be distributed via a network such as the Internet. Furthermore, the program may be recorded in a recording medium readable by a computer, such as a hard disk, a flexible disk (FD), a CD-ROM, an MO (Magneto-Optical disk), or a DVD (Digital Versatile Disc) so that it may be executed by being read from the recording medium by the computer.

According to the embodiments, it is possible to provide information for conducting scoring in the uniform manner in accordance with a scoring rule.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable recording medium having stored therein a performance display program that causes a computer to execute a process, the process comprising:

displaying on a display a video of a performance performed by a performer, the video being captured by a video camera, and synchronously therewith a 3D model image generated based on joint position data of the performer acquired by using a sensor during the performance;

having a user select a frame within the video;

referring to a storage unit registering therein scoring information where an event of the performance and an ID of an element performed therein are associated with each other, and specifying the ID of the element according to the event;

specifying, using the ID of the element, calculation information that is registered in the storage unit and includes the ID of the element, in association therewith, a calculation formula for calculating an angle formed by a joint of the performer used for scoring the element and a display plane where the calculated angle is displayed, and, based on the specified calculation information and the joint position data corresponding to the selected frame, calculating the angle; and displaying on an area of the display the selected frame and on another area of the display the calculated angle numerically and graphically on the display plane of the 3D model image corresponding to the selected frame, the display plane being included in the calculation information, the 3D model image being displayed as multiple images viewed from predetermined multiple viewpoints, wherein, in the scoring information the ID of the element is also associated with a threshold angle used for scoring the calculated angle and a scoring criterion determined in accordance with a difference between the threshold angle and the calculated angle; and the process further includes, in accordance with the scoring criterion corresponding to the calculated angle, changing a display color of the displayed angle.

2. The non-transitory computer-readable recording medium according to claim 1, wherein, the calculating includes also calculating angles based on the calculation information and the joint position data corresponding to frames previous to and next to the selected frame.

3. A performance display method comprising:

displaying on a display a video of a performance performed by a performer, the video being captured by a video camera, and synchronously therewith a 3D model image generated based on joint position data of the performer acquired by using a sensor during the performance, using a processor;

having a user select a frame within the video, using the processor;

referring to a storage unit registering therein scoring information where an event of the performance and an ID of an element performed therein are associated with each other, and specifying the ID of the element according to the event, using the processor;

specifying, using the ID of the element, calculation information that is registered in the storage unit and includes the ID of the element, in association therewith, a calculation formula for calculating an angle formed by a joint of the performer used for scoring the element and a display plane where the calculated angle is displayed, and, based on the specified calculation information and the joint position data corresponding to the selected frame, calculating the angle, using the processor; and displaying on an area of the display the selected frame and on another area of the display the calculated angle numerically and graphically on the display plane of the 3D model image corresponding to the selected frame, the display plane being included in the calculation information, the 3D model image being displayed as multiple images viewed from predetermined multiple viewpoints, using the processor wherein, in the scoring information the ID of the element is also associated with a threshold angle used for scoring the calculated angle and a scoring criterion determined in accordance with a difference between the threshold angle and the calculated angle; and the performance display method further includes, in accordance with the scoring criterion corresponding to the calculated angle, changing a display color of the displayed angle, using the processor.

4. The performance display method according to claim 3, wherein, the calculating includes also calculating angles based on the calculation information and the joint position data corresponding to frames previous to and next to the selected frame.

5. A performance display apparatus comprising:

a memory; and a processor coupled to the memory and configured to:

display on a display a video of a performance performed by a performer, the video being captured by a video camera, and synchronously therewith a 3D model image generated based on joint position data of the performer acquired by using a sensor during the performance;

have a user select a frame within the video;

refer to a storage unit registering therein scoring information where an event of the performance and an ID of an element performed therein are associated with each other, and specifying the ID of the element according to the event;

specify, using the ID of the element, calculation information that is registered in the storage unit and includes the ID of the element, in association therewith, a calculation formula for calculating an angle formed by a joint of the performer used for scoring the element and a display plane where the calculated angle is displayed, and, based on the specified calculation information and the joint position data corresponding to the selected frame, calculate the angle; and display on an area of the display the selected frame and on another area of the display the calculated angle numerically and graphically on the display plane of the 3D model image corresponding to the selected frame, the display plane being included in the calculation information, the 3D model image being displayed as multiple images viewed from predetermined multiple viewpoints, wherein, in the scoring information the ID of the element is also associated with a threshold angle used for scoring the calculated angle and a scoring criterion determined in accordance with a difference between the threshold angle and the calculated angle; and the process is further configured to, in accordance with the scoring criterion corresponding to the calculated angle, change a display color of the displayed angle.

6. The performance display apparatus according to claim 5, wherein the processor is further configured to:

calculate angles based on the calculation information and the joint position data corresponding to frames previous to and next to the selected frame.

* * * * *